(12) United States Patent
Huang

(10) Patent No.: US 12,435,991 B2
(45) Date of Patent: Oct. 7, 2025

(54) METHOD AND APPARATUS FOR GENERATING HIGH-PRECISION MAP, AND STORAGE MEDIUM

(71) Applicant: BEIJING BAIDU NETCOM SCIENCE TECHNOLOGY CO., LTD., Beijing (CN)

(72) Inventor: Jie Huang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 412 days.

(21) Appl. No.: 17/984,049

(22) Filed: Nov. 9, 2022

(65) Prior Publication Data
US 2023/0065126 A1 Mar. 2, 2023

(30) Foreign Application Priority Data
Nov. 11, 2021 (CN) .......................... 202111334734.X

(51) Int. Cl.
G01C 21/00 (2006.01)
G06T 7/73 (2017.01)
G06V 20/56 (2022.01)

(52) U.S. Cl.
CPC ............ *G01C 21/3815* (2020.08); *G06T 7/74* (2017.01); *G06V 20/588* (2022.01); *G06T 2207/10028* (2013.01); *G06T 2207/20212* (2013.01); *G06T 2207/30241* (2013.01); *G06T 2207/30256* (2013.01)

(58) Field of Classification Search
None
See application file for complete search history.

(56) References Cited

U.S. PATENT DOCUMENTS

| 2020/0072616 | A1* | 3/2020 | Shi .......................... G01C 21/30 |
| 2020/0124423 | A1 | 4/2020 | Jiang et al. |
| 2020/0348145 | A1 | 11/2020 | Paranjpe et al. |
| 2020/0393261 | A1* | 12/2020 | Zhang ................ G01C 21/3492 |
| 2021/0108926 | A1* | 4/2021 | Tran ....................... G06T 17/05 |
| 2021/0293564 | A1 | 9/2021 | Deng et al. |

(Continued)

FOREIGN PATENT DOCUMENTS

| CN | 108253973 A | 7/2018 |
| CN | 109631916 A | 4/2019 |

(Continued)

OTHER PUBLICATIONS

Search Report for European Application No. 22205829.9, dated Apr. 5, 2023, 14 pages.

(Continued)

*Primary Examiner* — Amelia Vorce
(74) *Attorney, Agent, or Firm* — Lippes Mathias LLP

(57) ABSTRACT

A method and an apparatus for generating a high-precision map includes sampling road data for generating the high-precision map, and obtaining a sampling trajectory, wherein the sampling trajectory comprises sampling location points and road data corresponding to the sampling location points, obtaining a navigation map comprising first road elements, and generating a target high-precision map by associating the first road elements with the high-precision map based on the sampling trajectory.

14 Claims, 3 Drawing Sheets

(56) References Cited

U.S. PATENT DOCUMENTS

2022/0049962 A1\* 2/2022 Jiang ................. G01C 21/3896
2022/0221300 A1\* 7/2022 Chikamori ......... G01C 21/3815

FOREIGN PATENT DOCUMENTS

| CN | 110345951 A | 10/2019 |
|----|-------------|---------|
| CN | 111192341 A | 5/2020 |
| CN | 112432650 A | 3/2021 |
| CN | 112595333 A | 4/2021 |
| CN | 113155141 A | 7/2021 |
| JP | 2020034906 A | 3/2020 |

OTHER PUBLICATIONS

Office Action for Japanese Patent Application No. 2022-179212, dated Oct. 24, 2023, 8 pages.
Office Action for Chinese Application No. 202111334734.X, dated Jun. 29, 2023, 17 pages.

\* cited by examiner

METHOD AND APPARATUS FOR GENERATING HIGH-PRECISION MAP, AND STORAGE MEDIUM

CROSS REFERENCE TO RELATED APPLICATION

This application is based on and claims priority to Chinese patent application No. 202111334734.X, filed on Nov. 11, 2021, the entire content of which is hereby introduced into this application by reference for all purposes.

TECHNICAL FIELD

The disclosure relates to the technical field of intelligent traffic, especially to the technical fields of artificial intelligence (AI), automatic driving, big data and cloud computing, and in particular to a method for generating a high-precision map, an apparatus for generating a high-precision map, and a storage medium.

BACKGROUND

A vehicle having an automatic driving function is generally provided with a high-precision map, to provide assistance for an automatic driving process of the vehicle. In an automatic driving scenario, implementing the automatic driving is required to accurately associate the high-precision map with a traditional navigation map.

SUMMARY

The disclosure provides a method for generating a high-precision map, an apparatus for generating a high-precision map, and a storage medium.

According to a first aspect of the disclosure, a method for generating a high-precision map is provided. The method includes: sampling road data for generating the high-precision map, and obtaining a sampling trajectory, in which the sampling trajectory includes sampling location points and road data corresponding to the sampling location points; obtaining a navigation map including first road elements; and generating a target high-precision map by associating the first road elements with the high-precision map based on the sampling trajectory.

According to a second aspect of the disclosure, an apparatus for generating a high-precision map is provided. The apparatus includes: at least one processor; and a memory communicatively coupled to the at least one processor. The memory stores instructions executable by the at least one processor, when the instructions are executed by the at least one processor, the at least one processor is configured to sample road data for generating the high-precision map, and obtain a sampling trajectory, in which the sampling trajectory includes sampling location points and road data corresponding to the sampling location points; obtain a navigation map including first road elements; generate a target high-precision map by associating the first road elements with the high-precision map based on the sampling trajectory.

According to a third aspect of the disclosure, a non-transitory computer-readable storage medium storing computer programs is provided. The computer programs are configured to cause a computer to implement sampling road data for generating the high-precision map, and obtaining a sampling trajectory, wherein the sampling trajectory comprises sampling location points and road data corresponding to the sampling location points; obtaining a navigation map comprising first road elements; and generating a target high-precision map by associating the first road elements with the high-precision map based on the sampling trajectory.

It should be understood that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

Figure 1:
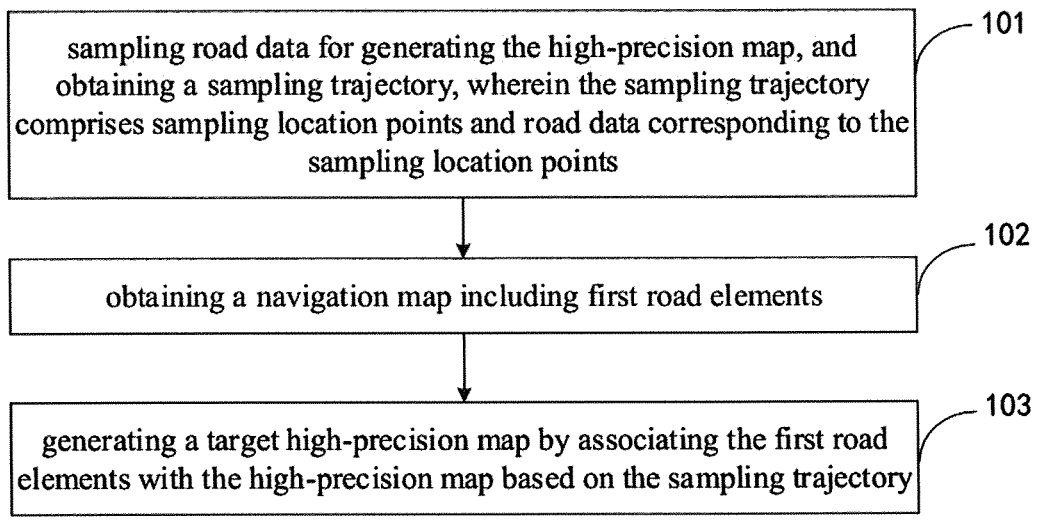
FIG. 1 is a flowchart of a method for generating a high-precision map according to an embodiment of the disclosure.

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

The following describes a method for generating a high-precision map, an apparatus for generating a high-precision map and an electronic device according to embodiments of the disclosure with reference to the accompanying drawings.

Intelligent Traffic System (ITS), also known as intelligent transportation system, is a comprehensive transportation system that guarantees safety, enhances efficiency, improves environment and saves energy, which is obtained by effectively integrating advanced science and technologies (e.g., information technology, computer technology, data communication technology, sensor technology, electronic control technology, automatic control theory, operations research, and AI) in transportation, service control and vehicle manufacturing, to strengthen connections among vehicles, roads and users. Through harmonious and close cooperation of people, vehicles and roads, the ITS improves traffic efficiency, relieves traffic congestion, improves road network capacity, and reduces traffic accidents, energy consumption and environmental pollution.

Big data, or huge data, refers to the amount of data involved that is too large to be captured, managed, processed and organized by current mainstream software tools within a reasonable period of time into information that helps enterprises to make business decisions with a more positive purpose. "Big data" requires new processing modes to achieve strong decision-making power, insight discovery power and process optimization ability to adapt to massive, high-growth, and diverse information assets. A strategic significance of the big data technology lies not in mastering huge amount of data information, but in professionally processing these meaningful data. In other words, if the big data is taken as an industry, a key to making this industry profitable is to improve a processing ability of data, and to realize added value of data through processing.

Artificial Intelligence (AI) is a new technical science that studies and develops theories, methods, techniques and application systems for simulating, extending and expanding human intelligence. AI is a branch of computer science that attempts to understand an essence of intelligence and produce a new kind of intelligent machine that can respond in a way similar to human intelligence. Research in this field may include robotics, language recognition, image recognition, natural language processing and expert systems, and the like. Since the birth of AI, the theory and technology of the AI have become more mature, and the application fields are expanding. It is conceivable that technological products brought by AI in the future will be a "container" of human intelligence. AI can simulate an information process of human consciousness and thinking. AI is not intelligence of human, but capable of thinking like human beings and beyond human intelligence.

Intelligent driving essentially involves cognitive engineering of attention attraction and attention dispersion, and generally includes three main components of network navigation, autonomic driving and human intervention. The premise for the intelligent driving is that a vehicle chosen satisfies dynamic requirements of driving, and sensors on the vehicle can obtain relevant audio-visual signals and information, and control a corresponding servo system through cognitive computing. The network navigation of the intelligent driving solves the problems of where we are, where we are going, which lane in which road to take. The autonomic driving is to complete driving behaviors, such as lane keeping, overtaking and merging, following traffic light rules and rules on vehicle lamps and horn under control of the intelligent system. The human intervention means that a driver responds accordingly to actual road situations under a series of prompts from the intelligent system.

Cloud computing is a type of distributed computing, which refers to decomposing a huge data computing processing program into countless small programs through a network "cloud", obtaining results by processing and analyzing these small programs by a system composed of multiple servers, and then sending the results to the user. In an early stage, the cloud computing briefly is simple distributed computing, solves task distribution and combines computing results. Therefore, the cloud computing is also called grid computing. Through this technology, a processing of tens of thousands of data can be completed in a very short period of time (several seconds), thereby achieving powerful network services. The "cloud" is essentially a network, which is narrowly defined as a network that provides resources. The user can obtain the resources on the "cloud" at any time, and use the resources according to their needs, and the resources are regarded as infinitely expandable, as long as the user pays according to usage. The "cloud" is like waterworks, the user can obtain water at any time without quantity limit only if the user pays the waterworks according to water consumption. FIG. 1 is a flowchart of a method for generating a high-precision map according to an embodiment of the disclosure.

As illustrated in FIG. 1, the method for generating a high-precision map may include the following blocks.

At block S101, road data for generating the high-precision map is sampled, and a sampling trajectory is obtained, in which the sampling trajectory includes sampling location points and road data corresponding to the sampling location points.

It is noted that the road data may include images and point cloud images of a road. In an embodiment of the disclosure, the road data of the road may be obtained through a data acquisition device mounted on a vehicle, and uploaded to a cloud server through a vehicle positioning system or a navigation Application (APP) installed on the vehicle. For example, the data acquisition device may be a vehicle camera, a vehicle radar or a vehicle sensor, and the like.

Optionally, the server is connected with at least one of a road information database and a traffic management platform, to obtain the road data of the high-precision map from at least one of the information database and the traffic management platform.

In an embodiment of the disclosure, locations of sampling points (sampling location points) may be determined at every sampling distance according to a certain sampling distance. The sampling distance is not fixed and may be set according to an actual situation. For example, the sampling distance may be 50 m, 100 m or 150 m or other distances.

Optionally, the sampling points may also be selected according to important nodes of the road. For example, the sampling points may be set at locations such as a tunnel, a sharp turn and signal lights.

It is noted that the sampling trajectory may include location information and sampling time points of the sampling points, and road data sampled at the sampling points. In the disclosure, all the sampling points are sorted according to at least one of the sampling time points and the location information of the sampling points, to generate the sampling trajectory. The sampling trajectory is often matched with a pattern of the road, to build an accurate map based on the road data carried by the sampling trajectory.

At block S102, a navigation map including first road elements is obtained.

In an embodiment of the disclosure, the first road elements may include a road type, signal light information and lane information, and the like. It is noted that the first road elements are generally applied in a traditional navigation map for indicating a situation of the road.

It is noted that the navigation map described in the above embodiment may be pre-built and stored in a storage space of the server, to facilitate subsequent acquisition and usage. Optionally, the navigation map may also be generated in real time based on the road data sampled for generating the navigation map.

At block S103, a target high-precision map is generated by associating the first road elements with the high-precision map based on the sampling trajectory.

In an embodiment of the disclosure, the first road elements and the road data may be calculated according to a high-precision map generation algorithm, to generate the target high-precision map. It should be noted that the algorithm is similar to an electronic map navigation algorithm, and may be confirmed according to the sampling location points, to prevent errors in calculation results due to data errors and improve accuracy of the target navigation map. Compared with an association between maps, the association algorithm between the map and the trajectory proposed in an embodiment is more mature and has a higher accuracy rate.

Optionally, the first road elements and the road data may also be input into a target high-precision map generation model for processing, to generate the target high-precision map. For example, the target high-precision map generation model may be pre-trained and stored in the storage space of the server to facilitate acquisition and usage when needed.

In embodiments of the disclosure, firstly, the road data for generating the high-precision map is sampled, and the sampling trajectory is obtained, the sampling trajectory includes the sampling location points and the corresponding road data. Then the navigation map including the first road elements is obtained. Finally, the target high-precision map is generated by associating the first road elements with the high-precision map based on the sampling trajectory. Therefore, the road data is matched with the traditional navigation map based on the location information to generate the target high-precision map. Compared with the traditional method for generating the target high-precision map based on the association between the maps, the algorithm of the disclosure is more mature and has the higher accuracy rate.

Figure 2:
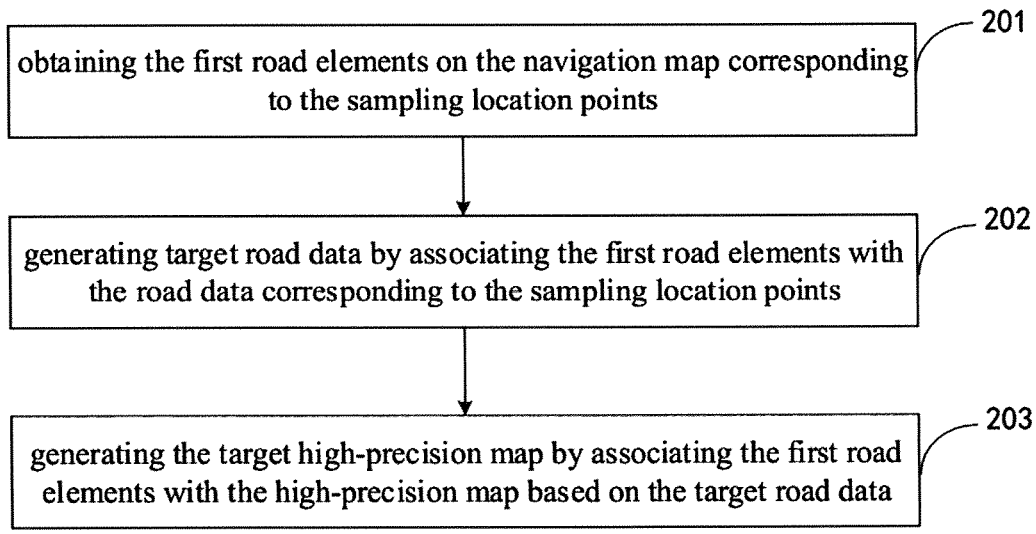
FIG. 2 is a flowchart of a method for generating a high-precision map according to another embodiment of the disclosure.

In the above embodiments, generating the target high-precision map by associating the first road elements with the high-precision map based on the sampling trajectory may be further explained by FIG. 2, and the method includes the following blocks.

At block S201, the first road elements on the navigation map corresponding to the sampling location points are obtained.

In an implementation, not every road sections of the road have conditions for automatic driving of vehicles. A location granularity of the navigation map is generally coarser than that of the high-precision map. In other words, a location point on the navigation map may generally contain a plurality of location points on the high-precision map. In the disclosure, location information of the navigation map may be matched with location information of the sampling location points to obtain the first road elements on the navigation map.

Optionally, positioning location points on the navigation map corresponding to the sampling location points are determined by performing location positioning on the navigation map based on the sampling location points. The first road elements at the positioning location points are determined as the first road elements on the navigation map corresponding to the sampling location points. That is, each sampling location point is matched with the location point on the navigation map, to obtain the location point on the navigation map covering the sampling location point as the positioning location point. Then, the first road element at the positioning location point is determined as the first road element on the navigation map corresponding to the sampling location point.

Thus, by matching a coordinate of each sampling location point with the navigation map, the accurate first road element corresponding to each sampling location point may be obtained, which provides a basis for the subsequent generation of the target high-precision map.

At block S202, target road data is generated by associating the first road elements with the road data corresponding to the sampling location points.

The sampled road data is included at each sampling location points. In the disclosure, after the first road element corresponding to each sampling location point is obtained, the road data corresponding to the same sampling location point may be bound to the corresponding first road element, to generate the target road data of the sampling location point.

It should be noted that the acquired road data may be single-frame data, or may be multi-frame data. The road data may also be processed after the road data is acquired.

Optionally, abnormal data check may be performed on the road data to select obviously wrong road data for elimination, to ensure an accuracy of constructing the map.

Optionally, the road data may be preprocessed to generate available data. In detail, the road data may be combined by a preset number of frames according to at least one of the sampling location points and the sampling time points of the sampling location points. In this way, data capable of being processed by the server may be obtained, to provide a basis for constructing the navigation map.

In an embodiment of the disclosure, coordinate information of each sampling location point is matched with the coordinate information of the high-precision map, to obtain the road data of each matching point, so as to generate the target road data.

At block S203, the target high-precision map is generated by associating the first road elements with the high-precision map based on the target road data.

In an embodiment of the disclosure, since the target road data includes not only the road data generated by the high-precision map, but also the associated first road elements, the target high-precision map associated with the first road elements of the navigation map is generated based on the target road data. Thus, by generating the target road data, an accurate target high-precision map may be generated, and the first road elements may be associated with the target high-precision map, to realize data association.

Figure 3:
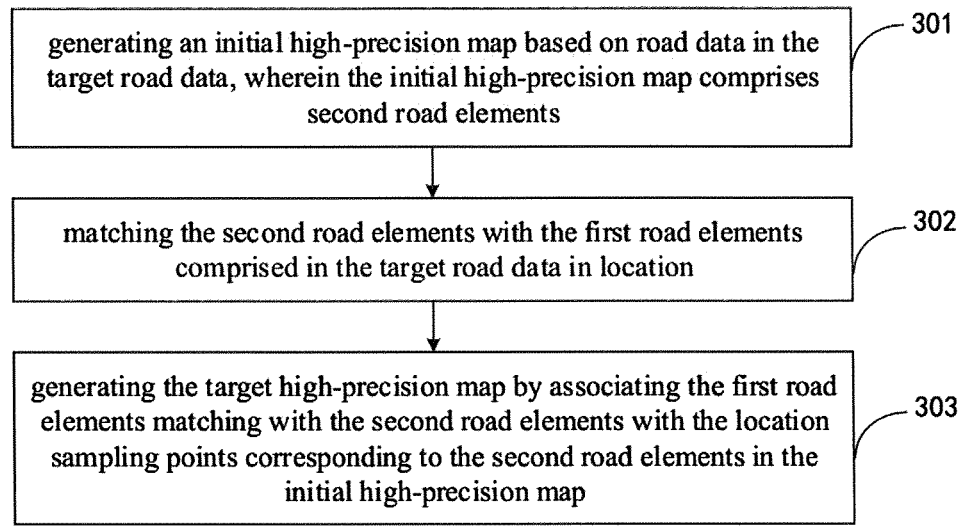
FIG. 3 is a flowchart of a method for generating a high-precision map according to yet another embodiment of the disclosure.

In the above embodiment, generating the target high-precision map by associating the first road elements with the high-precision map based on the sampling trajectory may be further explained by FIG. 3, and the method includes the following blocks.

At block S301, an initial high-precision map is generated based on road data in the target road data, in which the initial high-precision map includes second road elements.

In embodiments of the disclosure, the second road elements may include a road type, signal light information and lane information. The second road elements are generally applied in the high-precision map to indicate a road condition of a road. Compared with the first road elements of the traditional map, the second road elements of the initial high-precision map have higher precision and contain more data. For example, a precision of the first road elements may be 10 m, and a precision of the second road elements may be 0.1 m. Each first road element may include lane information, and each second road element may include not only the lane information, but also color and width of a lane and other information.

At block S302, the second road elements are matched with the first road elements included in the target road data in locations.

In an embodiment of the disclosure, each second road element and each first road element may further include coordinate information. The coordinate information of the second road element may be matched with the coordinate information of the first road element.

At block S303, the target high-precision map is generated by associating the first road elements matching with the second road elements with the location sampling points corresponding to the second road elements in the initial high-precision map.

In the above embodiments, the initial high-precision map is generated according to the road data in the target road data. The initial high-precision map includes the second road elements, and then the second road elements are matched with the first road elements included in the target road data in location. Finally, the first road elements matching with the second road elements are associated with the location sampling points corresponding to the second road elements in the initial high-precision map, to generate the target high-precision map. Therefore, the target high-precision map is generated by associating the first road elements with the second road elements based on the coordinate locations. Compared with the traditional method based on the association between maps, the disclosure has a higher accuracy rate and a lower update cost.

Figure 4:
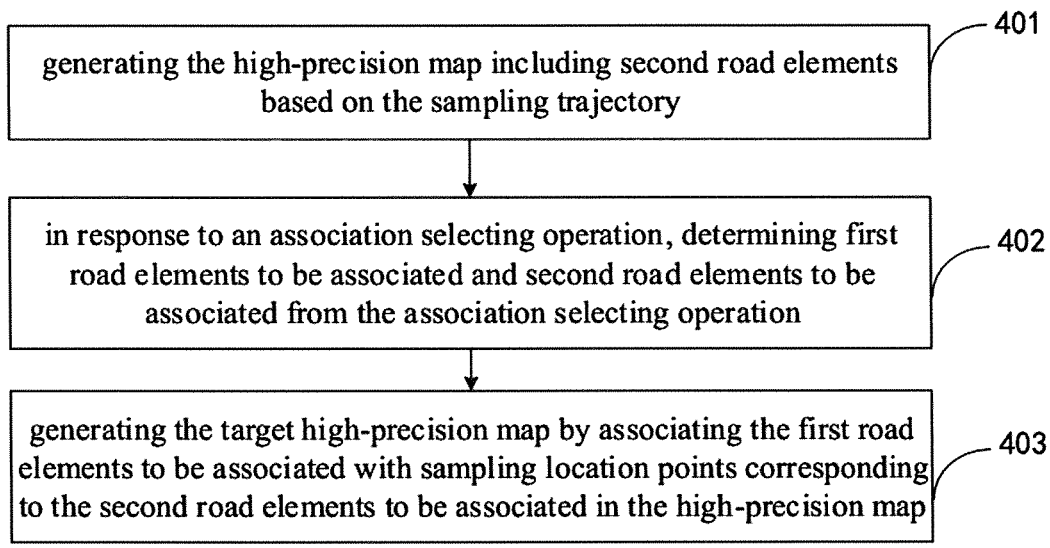
FIG. 4 is a flowchart of a method for generating a high-precision map according to still another embodiment of the disclosure.

In the above embodiment, generating the target high-precision map by associating the first road elements with the high-precision map based on the sampling trajectory may be further explained by FIG. 4, and the method includes the following blocks.

At block S401, the high-precision map including second road elements is generated based on the sampling trajectory.

In an embodiment of the disclosure, the sampling trajectory may be input into a high-precision map generation model for processing, to generate the high-precision map. The high-precision map generation model may be pre-trained and stored in a storage space of a server, to facilitate acquisition and usage when needed.

At block S402, in response to an association selecting operation, first road elements to be associated and second road elements to be associated are determined from the association selecting operation.

In an embodiment of the disclosure, the first road elements to be associated and the second road elements to be associated are brought in the association selecting operation, and based on a stay position of the association selecting operation on the screen, at least one of the first road elements and the second road elements corresponding to the stay position are determined. The first road elements corresponding to the stay position are determined as the first road elements to be associated, or the second road elements corresponding to the stay position are determined as the second road elements to be associated, or the first road elements and the second road elements corresponding to the stay position are determined as the first road elements to be associated and the second road elements to be associated.

For example, the navigation map and the high-precision map may be displayed on the server simultaneously, and the user may select the first road elements from the navigation map by a dragging operation as the first road elements to be associated. Moreover, the second road elements selected from the high-precision map are used as the second road elements to be associated. Then the association selecting operation is generated based on the dragging operation, to notify the server of the first road elements to be associated and the second road elements to be associated.

At block S403, the target high-precision map is generated by associating the first road elements to be associated with sampling location points corresponding to the second road elements to be associated in the high-precision map.

Further, after obtaining an instruction of the association selecting operation, the server may generate the target high-precision map by matching the location information of the first road elements with the location information of the second road elements.

In an embodiment of the disclosure, firstly, the high-precision map is generated based on the sampling trajectory, and the high-precision map includes the second road elements. Then, in response to the association selecting operation, the first road elements to be associated and the second road elements to be associated are determined according to the association selecting operation. Finally, the first road elements to be associated are associated with the sampling location points corresponding to the second road elements to be associated in the high-precision map, to generate the target high-precision map. Therefore, the target high-precision map may be generated based on the instruction of the association selecting operation manually or by the server. The user may choose to use the traditional map, the high-precision map or the target high-precision map, to increase user experience.

Figure 5:
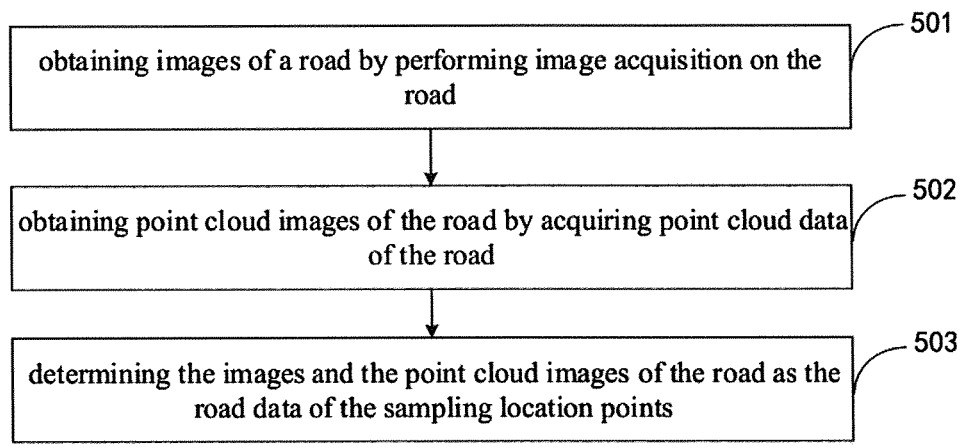
FIG. 5 is a flowchart of a method for generating a high-precision map according to still another embodiment of the disclosure.

In the above embodiment, sampling the road data for generating the high-precision map may be further explained by FIG. 5, and the method includes the following blocks.

At block S501, images of a road are obtained by performing image acquisition on the road.

In an embodiment of the disclosure, the images of the road may be obtained through an image acquisition device mounted on a vehicle, and uploaded to the cloud server through a vehicle positioning system or a navigation APP installed on the vehicle. For example, the image acquisition device may be a vehicle camera, or a vehicle radar, and the like.

At block S502, point cloud images of the road are obtained by acquiring point cloud data of the road.

In an embodiment of the disclosure, the point cloud images of the road may be obtained through a point cloud data acquisition device installed on the vehicle, and uploaded to the cloud server through the vehicle positioning system or the navigation APP installed on the vehicle. For example, the image acquisition device may be a vehicle radar, or a vehicle sensor, and the like.

At block S503, the images and the point cloud images of the road are determined as the road data of the sampling location points.

It should be noted that the images and the point cloud images of the road acquired by the server may bring position information, and the server may match position information of the images and the point cloud images of the road with position information of the sampling location points to determine the road data of the sampling location points.

In an embodiment of the disclosure, firstly, the image acquisition is performed on the road to obtain the images of the road, then the point cloud data of the road is acquired to obtain the point cloud images of the road, and finally the images and the point cloud images of the road are determined as the road data of the sampling location points. Therefore, the location images and the point cloud images of the road may be obtained by the vehicle-mounted device, and the road data of the road may be obtained more intuitively, which is convenient for data analysis and manual confirmation of the road, to avoid inaccuracy of the target high-precision map due to data errors.

Further, the target high-precision map generated according to embodiments of the disclosure has different real-time performance of data compared with the traditional map. An update frequency of the traditional navigation electronic maps may be classified into permanent static data, e.g., having an update frequency of one month, and semi-permanent static data, e.g., having an update frequency of one hour. The high-precision map has higher requirements on real-time performance of data, and the update frequency of which is generally semi-dynamic data, e.g., having an update frequency of one minute, or dynamic data, e.g., having an update frequency of one second. The target high-precision map generated in the relate art cannot update the high-precision map and the traditional map separately, while the target high-precision map generated by the solution of the present disclosure can update the high-precision map and the traditional map separately according to update requirements (e.g., update period) of the high-precision map and the traditional map when updating the maps, thus update cost of the target high-precision map may be reduced.

Corresponding to the high-precision map generation method of the above embodiments, the embodiment of the disclosure also provides an apparatus for generating a high-precision map. Since the apparatus for generating a high-precision map of the embodiments of the disclosure corresponds to the method for generating a high-precision map of the above embodiments, the implementation of the method for generating a high-precision map is also applicable to the apparatus for generating a high-precision map of the embodiments of the disclosure, which will not be described in detail in the following embodiments.

Figure 6:
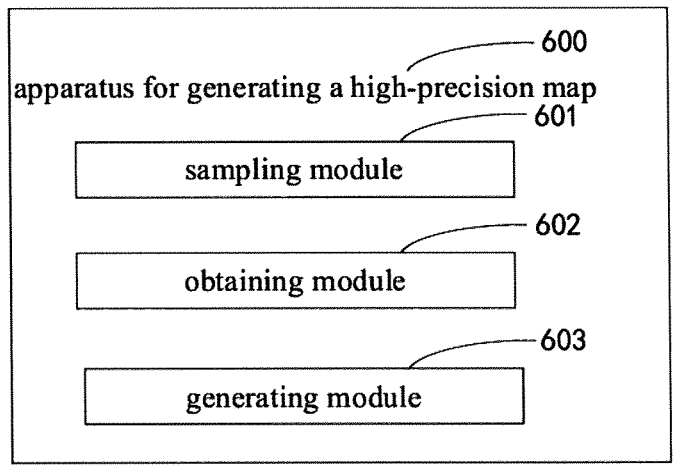
FIG. 6 is a schematic diagram of an apparatus for generating a high-precision map according to an embodiment of the disclosure.

FIG. 6 is a schematic diagram of an apparatus for generating a high-precision map according to an embodiment of the disclosure.

As illustrated in FIG. 6, the apparatus for generating a high-precision map 600 may include: a sampling module 601, an obtaining module 602 and a generating module 603.

The sampling module 601 is configured to sample road data for generating the high-precision map, and obtain a sampling trajectory, in which the sampling trajectory includes sampling location points and road data corresponding to the sampling location points.

The obtaining module 602 is configured to obtain a navigation map including first road elements.

The generating module 603 is configured to generate a target high-precision map by associating the first road elements with the high-precision map based on the sampling trajectory.

In an embodiment of the disclosure, the generating module 603 is further configured to:
  obtain the first road elements on the navigation map corresponding to the sampling location points;
  generate target road data by associating the first road elements with the road data corresponding to the sampling location points; and
  generate the target high-precision map by associating the first road elements with the high-precision map based on the target road data.

In an embodiment of the disclosure, the generating module 603 is further configured to:
  determine positioning location points on the navigation map corresponding to the sampling location points by performing location positioning on the navigation map based on the sampling location points; and
  determine the first road elements at the positioning location points as the first road elements on the navigation map corresponding to the sampling location points.

In an embodiment of the disclosure, the generating module 603 is further configured to:
  generate an initial high-precision map based on road data in the target road data, in which the initial high-precision map includes second road elements;
  match the second road elements with the first road elements comprised in the target road data in location; and
  generate the target high-precision map by associating the first road elements matching with the second road elements with the location sampling points corresponding to the second road elements in the initial high-precision map.

In an embodiment of the disclosure, the generating module 603 is further configured to:
  generate the high-precision map including second road elements based on the sampling trajectory;
  in response to an association selecting operation, determine first road elements to be associated and second road elements to be associated from the association selecting operation; and
  generate the target high-precision map by associating the first road elements to be associated with sampling location points corresponding to the second road elements to be associated in the high-precision map.

In an embodiment of the disclosure, the sampling module 601 is further configured to:
  obtain images of a road by performing image acquisition on the road;
  obtain point cloud images of the road by acquiring point cloud data of the road; and
  determine the images and the point cloud images of the road as the road data of the sampling location points.

In an embodiment of the disclosure, the sampling module 601 is further configured to:
  combine the road data by a preset number of frames based on at least one of the sampling location points and sampling time points of the sampling location points.

In the technical solution of the disclosure, the acquisition, storage and application of the user's personal information involved all comply with the provisions of relevant laws and regulations, and do not violate public order and good customs.

According to the embodiments of the disclosure, the disclosure provides an electronic device, a readable storage medium and a computer program product.

Figure 7:
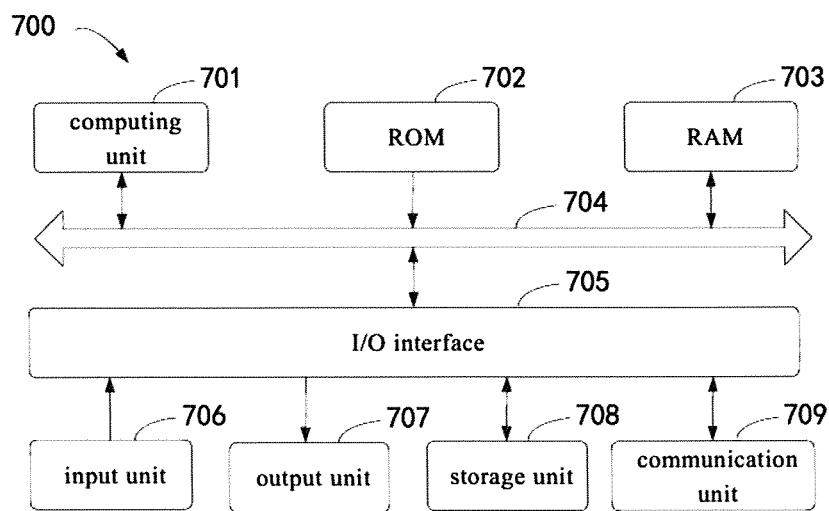
FIG. 7 is a block diagram of an electronic device configured to implement a method for generating a high-precision map according to an embodiment of the disclosure.

FIG. 7 is a block diagram of an example electronic device 700 used to implement the embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 7, the electronic device 700 includes: a computing unit 701 performing various appropriate actions and processes based on computer programs stored in a read-only memory (ROM) 702 or computer programs loaded from the storage unit 708 to a random access memory (RAM) 703. In the RAM 703, various programs and data required for the operation of the device 700 are stored. The computing unit 701, the ROM 702, and the RAM 703 are connected to each other through a bus 704. An input/output (I/O) interface 705 is also connected to the bus 704.

Components in the device 700 are connected to the I/O interface 705, including: an inputting unit 706, such as a keyboard, a mouse; an outputting unit 707, such as various types of displays, speakers; a storage unit 708, such as a disk, an optical disk; and a communication unit 709, such as network cards, modems, and wireless communication transceivers. The communication unit 709 allows the device 700 to exchange information/data with other devices through a computer network such as the Internet and/or various telecommunication networks.

The computing unit 701 may be various general-purpose and/or dedicated processing components with processing and computing capabilities. Some examples of computing unit 701 include, but are not limited to, a central processing unit (CPU), a graphics processing unit (GPU), various dedicated AI computing chips, various computing units that run machine learning model algorithms, and a digital signal processor (DSP), and any appropriate processor, controller and microcontroller. The computing unit 701 executes the various methods and processes described above, such as the method for generating a high-precision map. For example, in some embodiments, the method may be implemented as a computer software program, which is tangibly contained in a machine-readable medium, such as the storage unit 708. In some embodiments, part or all of the computer program may be loaded and/or installed on the device 700 via the ROM 702 and/or the communication unit 709. When the computer program is loaded on the RAM 703 and executed by the computing unit 701, one or more steps of the method described above may be executed. Alternatively, in other embodiments, the computing unit 701 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), the Internet and the block-chain network.

The computer system may include a client and a server. The client and server are generally remote from each other and interacting through a communication network. The client-server relation is generated by computer programs running on the respective computers and having a client-server relation with each other. The server may be a cloud server, a server of a distributed system, or a server combined with a block-chain.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for generating a high-precision map, comprising:
   sampling road data, and obtaining a sampling trajectory, wherein the sampling trajectory comprises sampling location points and road data corresponding to the sampling location points;
   obtaining a navigation map comprising first road elements; and
   generating a target high-precision map by associating the first road elements of the navigation map with a high-precision map based on the sampling trajectory;
   wherein generating the target high-precision map by associating the first road elements with the high-precision map based on the sampling trajectory comprises:
   obtaining the first road elements on the navigation map corresponding to the sampling location points;
   generating target road data by associating the first road elements with the road data corresponding to the sampling location points;
   generating an initial high-precision map based on road data in the target road data, wherein the initial high-precision map comprises second road elements;
   matching the second road elements with the first road elements comprised in the target road data in location; and
   generating the target high-precision map by associating the first road elements matching with the second road elements with the location sampling points corresponding to the second road elements in the initial high-precision map.

2. The method of claim 1, wherein obtaining the first road elements on the navigation map corresponding to the sampling location points comprises:
   determining positioning location points on the navigation map corresponding to the sampling location points by performing location positioning on the navigation map based on the sampling location points; and
   determining the first road elements at the positioning location points as the first road elements on the navigation map corresponding to the sampling location points.

3. The method of claim 1, wherein generating the target high-precision map by associating the first road elements with the high-precision map based on the sampling trajectory comprises:
   generating the high-precision map comprising second road elements based on the sampling trajectory;
   in response to an association selecting operation, determining first road elements to be associated and second road elements to be associated from the association selecting operation; and
   generating the target high-precision map by associating the first road elements to be associated with sampling location points corresponding to the second road elements to be associated in the high-precision map.

4. The method of claim 1, wherein sampling the road data for generating the high-precision map comprises:
   obtaining images of a road by performing image acquisition on the road;
   obtaining point cloud images of the road by acquiring point cloud data of the road; and
   determining the images and the point cloud images of the road as the road data of the sampling location points.

5. The method of claim 1, after determining the road data of the sampling location points, further comprising:
   combining the road data by a preset number of frames based on at least one of the sampling location points and sampling time points of the sampling location points.

6. An apparatus for generating a high-precision map, comprising:
   at least one processor; and
   a memory communicatively coupled to the at least one processor; wherein,
   the memory stores instructions executable by the at least one processor, when the instructions are executed by the at least one processor, the at least one processor is configured to:
   sample road data, and obtain a sampling trajectory, wherein the sampling trajectory comprises sampling location points and road data corresponding to the sampling location points;
   obtain a navigation map comprising first road elements; and
   generate a target high-precision map by associating the first road elements of the navigation map with a high-precision map based on the sampling trajectory;
   wherein the at least one processor is further configured to:
   obtain the first road elements on the navigation map corresponding to the sampling location points;
   generate target road data by associating the first road elements with the road data corresponding to the sampling location points;
   generate an initial high-precision map based on road data in the target road data, wherein the initial high-precision map comprises second road elements;
   match the second road elements with the first road elements comprised in the target road data in location; and
   generate the target high-precision map by associating the first road elements matching with the second road elements with the location sampling points corresponding to the second road elements in the initial high-precision map.

7. The apparatus of claim 6, wherein the at least one processor is further configured to:
   determine positioning location points on the navigation map corresponding to the sampling location points by performing location positioning on the navigation map based on the sampling location points; and
   determine the first road elements at the positioning location points as the first road elements on the navigation map corresponding to the sampling location points.

8. The apparatus of claim 6, wherein the at least one processor is further configured to:
   generate the high-precision map comprising second road elements based on the sampling trajectory;
   in response to an association selecting operation, determine first road elements to be associated and second road elements to be associated from the association selecting operation; and
   generate the target high-precision map by associating the first road elements to be associated with sampling location points corresponding to the second road elements to be associated in the high-precision map.

9. The apparatus of claim 6, wherein the at least one processor is further configured to:
   obtain images of a road by performing image acquisition on the road;
   obtain point cloud images of the road by acquiring point cloud data of the road; and
   determine the images and the point cloud images of the road as the road data of the sampling location points.

10. The apparatus of claim 6, wherein the at least one processor is further configured to:
    combine the road data by a preset number of frames based on at least one of the sampling location points and sampling time points of the sampling location points.

11. A non-transitory computer-readable storage medium having computer instructions stored thereon, wherein the computer instructions are configured to cause a computer to implement:
    sampling road data, and obtaining a sampling trajectory, wherein the sampling trajectory comprises sampling location points and road data corresponding to the sampling location points;
    obtaining a navigation map comprising first road elements; and
    generating a target high-precision map by associating the first road elements of the navigation map with a high-precision map based on the sampling trajectory;
    wherein generating the target high-precision map by associating the first road elements with the high-precision map based on the sampling trajectory comprises:
    obtaining the first road elements on the navigation map corresponding to the sampling location points;
    generating target road data by associating the first road elements with the road data corresponding to the sampling location points;
    generating an initial high-precision map based on road data in the target road data, wherein the initial high-precision map comprises second road elements;
    matching the second road elements with the first road elements comprised in the target road data in location; and
    generating the target high-precision map by associating the first road elements matching with the second road elements with the location sampling points corresponding to the second road elements in the initial high-precision map.

12. The storage medium of claim 11, wherein obtaining the first road elements on the navigation map corresponding to the sampling location points comprises:
    determining positioning location points on the navigation map corresponding to the sampling location points by performing location positioning on the navigation map based on the sampling location points; and
    determining the first road elements at the positioning location points as the first road elements on the navigation map corresponding to the sampling location points.

13. The storage medium of claim 11, wherein generating the target high-precision map by associating the first road elements with the high-precision map based on the sampling trajectory comprises:
    generating the high-precision map comprising second road elements based on the sampling trajectory;
    in response to an association selecting operation, determining first road elements to be associated and second road elements to be associated from the association selecting operation; and
    generating the target high-precision map by associating the first road elements to be associated with sampling location points corresponding to the second road elements to be associated in the high-precision map.

14. The storage medium of claim 11, wherein sampling the road data for generating the high-precision map comprises:
    obtaining images of a road by performing image acquisition on the road;
    obtaining point cloud images of the road by acquiring point cloud data of the road; and
    determining the images and the point cloud images of the road as the road data of the sampling location points.

* * * * *